Dec. 7, 1971  L. G. RICHARD  3,624,938
FOOLPROOF CREDIT CARD
Filed Jan. 8, 1970

*INVENTOR:*
LEWIS GEORGE RICHARD
BY
Pastoriza & Kelly
ATTORNEYS

United States Patent Office 3,624,938
Patented Dec. 7, 1971

3,624,938
FOOLPROOF CREDIT CARD
Lewis George Richard, Pacific Palisades, Calif., assignor to Kazuo Nakano, Gardena, Calif.
Filed Jan. 8, 1970, Ser. No. 1,380
Int. Cl. G09f 3/02; H01h 43/08; G06k 7/06, 19/04
U.S. Cl. 40—2.2
7 Claims

ABSTRACT OF THE DISCLOSURE

A self-authenticating credit card device includes a plurality of discs rotatably positioned in a card with portions projecting beyond an edge of the card so that a person may freely rotate the discs with a thumb or a single finger. Stationary indicia marked on the card corresponds with movable indicia marked on the discs so that a predetermined secret combination known only to an authorized card user may be established.

When the discs are rotated to establish the secret combination then wiper blades carried by the discs are urged into electrical contact with associated segments of an electrical circuit to switch the electrical circuit from an interrupted condition to a closed condition. When the electrical circuit in its closed condition is coupled to a signal circuit associated with a credit card information recording device, a signal will be imparted to indicate that the person possessing the card is a valid authorized user.

BACKGROUND OF THE INVENTION

This invention relates to credit cards and more specifically to a credit card arrangement incorporating rotary electrical switches and an electrical circuit which can be manipulated into a secret coded combination only by a credit card holder or authorized user so that financial harm cannot be caused by unauthorized use of a credit card that has been lost, misplaced, stolen, etc.

Organizations vitally involved with the credit card industry such as credit card issuer or sponsor companies and credit card insurance carriers estimate that an alarming number of credit cards are lost or stolen each year (estimated to be 9 million) and subsequently fraudulently used by parties for an enormous amount of credit (estimated to be 150 million dollars).

Due to difficulties in quickly pinpointing and otherwise combating credit card crimes, both professional and amateur wrongdoers are not effectively deterred from practicing their credit card frauds. Many law enforcement organizations attempt to monitor the underground market in major cities for lost and stolen credit cards that are given black market price tags by parties in organized crime.

Some credit card issuer companies have already resorted to electronic devices and anti-fraud computers to reduce the effects of credit card fraud.

Other credit card companies, in an effort to create a fool proof means for curbing credit card fraud, have suggested using tamper-proof color photos of credit card holders imbedded into the credit card. Some companies have proposed that the holder or his authorized user indicate a memorized code to the merchant.

A sophisticated approach that has been suggested involves a finger print system that would enable merchants to use finger prints with the credit card. When a customer wishes to charge goods or services he would place his thumb on an electronic scanning device and the print would be compared with one already on file in a computer that would verify the identity of the customer.

A further proposed technique comprehends imbedding a miniature zone of magnetic coded information in the credit card that can be quickly decoded and checked by a machine when the card holder presents the card to a retail clerk.

BRIEF SUMMARY OF THE INVENTION

Briefly stated this invention comprehends a fool proof or self authenticating credit card device that may be swiftly and effectively used in connection with a slightly modified conventional credit card information printing device to indicate whether or not a card holder presenting a credit card in payment for services or goods is in fact a valid, authorized user.

In its broadest aspects the self-authenticating credit card device incorporates a card having a front face marked with credit information, a rear face, and an edge extending between the front and rear faces. A plurality of retaining pockets formed within the card rotatably position a plurality of discs with portions projecting beyond the card edge so that a person may selectively rotate the discs with a thumb or a single finger.

The discs are marked with first visible indicia and the card front face is marked with second visible indicia in a plurality of locations corresponding with the first indicia. An electrical circuit has a pair of terminals carried by the card and multiple electrically conductive segments carried in part by the card and in part by the discs. To use the self authenticating credit card device, the discs may be rotated to arrange the first and second indicia in a predetermined secret combination in order to switch the electrical circuit from an interrupted condition to a closed condition enabling electrical current to travel continuously from one terminal through all of the segments and eventually to the other terminal.

Hubs projecting outwardly from central portions of the discs extend into corresponding circular sockets formed between the card front face and a card interior portion. The first indicia may be arrows marked on the hubs while the second indicia may be consecutive numbers generally encircling the hubs.

The electrically conductive segments carried by the discs are wiper blades that extend into slots formed through the discs. Preferably each wiper blade is a leaf spring cantilevered from a peripheral portion of its associated slot. Each wiper blade is shaped in its central region with a hump having a flat portion that extends beyond the external periphery of the associated disc in order to make superior electrical contact with the electrical circuit segments carried by the card.

The card is substantially flat, opaque and rectangular and all the discs project from a straight common edge of the card. The pockets define slits in the card edge that are shorter than the diameter of the discs to assist in holding the discs in the pockets.

When the self-authenticating credit card device of this invention is presented to a merchant in exchange for services or goods then the merchant may promptly learn whether the card holder is authorized by inserting the credit card into a credit card information recording device having an electrical signal circuit with a pair of contacts arranged and spaced to engage the credit card terminals. When the signal circuit contacts and the electrical circuit terminals are engaged then a signal will be imparted to indicate a valid use only if the person is able to rotate the discs to positions where the secret predetermined combination is established.

BRIEF DESCRIPTION OF THE DRAWINGS

The numerous benefits and unique aspects of the present invention will be fully understood when the following detailed description is studied in conjunction with the drawings in which.

DETAILED DESCRIPTION OF THE PREFERRED EMBODIMENT

Figure 1:
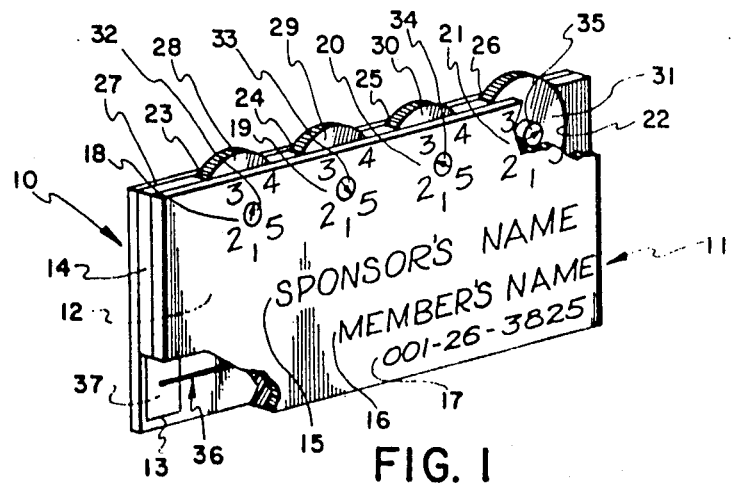
FIG. 1 is a perspective view with portions broken away, showing a self-authenticating credit card device constructed in accordance with this invention.

Referring now to FIG. 1, a self authenticating or foolproof credit card device 10 is shown that incorporates a basically flat rectangular card 11 constructed preferably from a durable type of opaque plastic. Card 1 is of laminate or sandwich construction and includes a front sheet 12, a rear sheet 13 and an intermediate sheet 14. These sheets may be mutually bonded or adhered, or, mechanically fastened together by any suitable conventional connectors.

The front or visible face of front sheet 12 has one area 15 marked with the issuer's or sponsor's name, an area 16 designating the primary user's or member's name and a third area 17 bearing the person's membership or accounting number. Also illustrated on the visible face of front sheet 12 are four annular zones 18, 19, 20 and 21 that bear consecutive numbers printed in a clockwise direction. While the indicia of zones 18, 19, 20 and 21 are characterized by numbers 1–15, a grouping of letters or series of symbols or the like.

Formed within the card 11 between front sheet 12 and rear sheet 13 are four retaining pockets 22, only one of which is shown. The outer portions of the pockets 22 constitute four narrow slits 23, 24, 25 and 26 that lie in a straight line along a common edge 27 of card 11.

Rotataby positioned within the pockets 22 are four identically shaped circular discs 28, 29, 30 and 31 whose diameters are larger than the lengths of the slits 23, 24, 25 and 26 so that the wall sections of edge 27 between the slits can serve as abutments to assist in holding the discs in their pockets.

Projecting outwardly from at least one central side portion of discs 28, 29 30 and 31 are hubs 32, 33, 34 and 35 respectively which extend through corresponding circular sockets formed through card front sheet 12.

Embodied within credit card device 10 is an electrical circuit 36 that has a pair of elongated strips arranged on opposing margins of and extending through rear sheet 13. Only one of the terminals designated by numeral 37 is shown in FIG. 1.

Figure 2:
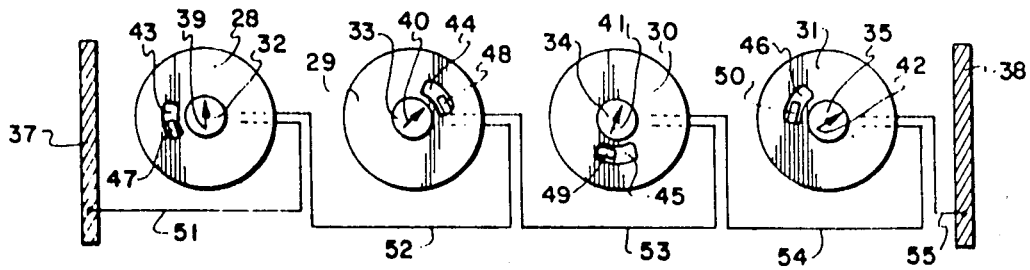
FIG. 2 is a schematic electrical circuit diagram, showing electrical wiper blades carried by the four rotatable discs and electrically conductive segments carried by the card.

Referring primarily to FIG. 2 the electrical circuit 36 has a pair of terminals 37 and 38 spaced by a pre-determined distance for a purpose to be described. The hubs 32, 33, 34 and 35 bear visible indicia in the form of arrows 39, 40, 41 and 42 respectively. Extending through the discs 28, 29, 30 and 31 at locations radially outwardly from their hubs, are a plurality of arcuate shaped slots 43, 44, 45 and 46 respectively. Projecting across a portion of the slots are a series of electrical conductive wiper blades 47, 48, 49 and 50 that serve as electrical contacts. The structure constituted by each associated rotatable disc and wiper blade may be regarded as a rotatable switch.

In addition to terminals 37 and 38 cord 11 carries other electrically conductive segments 51, 52, 53 and 54 (either imbedded within or bonded intermediate sheet 14). The adjacent ends of these segments constitute four pairs of mating leads positioned to make electrical wiping contact with corresponding wiper blades. For example, these leads constituted by the adjacent ends of segments 51 and 52 are superimposed over and extend sufficiently towards the center of disc 28 so that wiper blade 47 may be rotated to bridge across the leads 51 and 52 to establish continuous electrical contact at that juncture.

It should be noted that the orientation between the sets of arrows and wiper blades are different from one another and their relationships cannot be determined by observation, or, figured out by reverse engineering, for example, without disassembling and destroying credit card device 10. In accordance with secret coded or combination information furnished to the member by the issuer company, the arrows must be aimed at different visible indicia numbers shown in FIG. 1 in order to complete the electrical circuit 36 between terminals 37 and 38.

Figure 3:
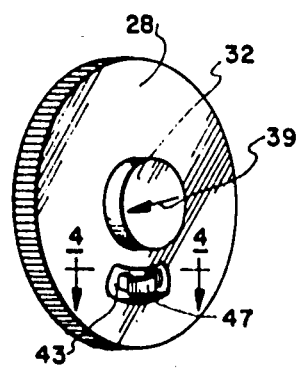
FIG. 3 is a perspective enlarged view, showing a single disc with indicia printed on a hub portion and an electrical wiper blade extending into a slot.
Figure 4:
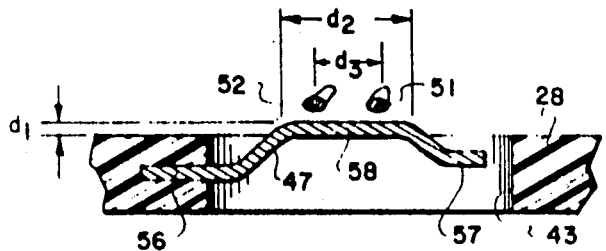
FIG. 4 is an enlarged sectional view taken along line 4—4 of FIG. 3, showing how a circuit segment portion may be closed by contact between a hump portion of the wiper blade and a pair of electrical leads illustrated exploded upwardly from the blade; and, FIG. 5 is a perspective, partially schematic and exploded view, showing how a modified conventional credit card information recording device can be used in conjunction with the self authenticating credit card device of this invention.

Referring to FIGS. 3 and 4 wherein additional details of disc 28 are described as illustrative of all the discs, one end 56 of wiper blade 47 is imbedded into a peripheral portion of slot 43. Wiper blade 47 extends across a peripheral portion of slot 43. Wiper blade 47 extends across most of the length of slot 43 and terminates in a free end 57. A central region of blade 47 is bent into the shape of a hump that has a flat portion 58 which extends beyond the external peripheral of disc 28 by distance $d_1$, and, has a length indicated by $d_2$. Because wiper blade 47 is constructed in the form of a cantilevered leaf spring, when hump flat portion 58 commences wiping contact against leads 51 and 52 (shown exploded upwardly for illustration purposes) a fraudulent card holder will not be able to feel a nudge or bump as contact is made. In other words as electrical contact is being established between a set of mating leads and a wiper blade this event cannot be detected by a sense of feel because the transition is smooth and gentle.

Figure 5:
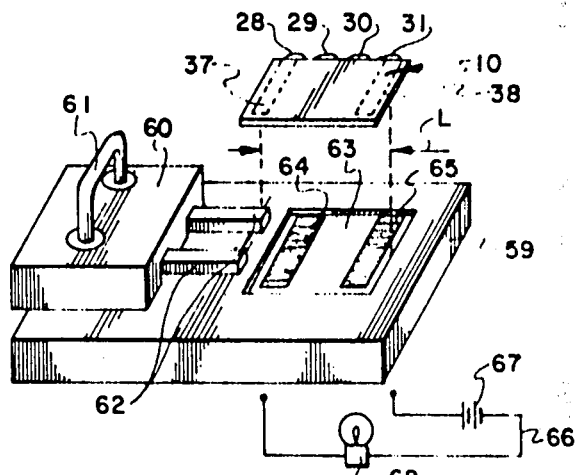

Referring to FIG. 5 a conventional credit card information recording device 59 is shown with the ordinary pressure bar 60 having handle 61 by which a merchant may slide pressure bar 60 from side to side on tracks 62. Device 59 has a rectangular shaped tray 63 sized to accept and retain self authenticating credit card device 10 that is shown exploded upwardly over tray 63. The tray 63 has a pair of electrical contacts 64 and 56 that are spaced by substantially the same distance L as are the strip terminals 37 and 38 of credit card device 10.

Contacts 64 and 65 are electrically wired to a signal circuit 66 that has an electrical power source such as a battery 67 and an indicator light 68 that could alternatively be an audible indicator such as a buzzer. As shall be more fully explained in connection with the description of the operation of this invention, the indicator light 68 will become energized only when a person knows and establishes the secret combination of credit card device 10.

OPERATION

Keeping the above construction in mind it can be understood how the previously described disadvantages of techniques for preventing credit card fraud are overcome or substantially eliminated by the present invention.

When an issuer company or sponsor furnishes a self authenticating credit card device 10 to a member the secret code or combination may be communicated either at that time or subsequently.

When the primary user learns the combination then only he and those people who have been authorized by him will be able to convince a merchant that an authorized credit card use is being made. This can be accomplished without informing the merchant or retail clerk, who may be unscrupulous, of the secret combination.

When an authorized person presents credit card device 10 to the merchant he will have previously rotated discs 28, 29, 30 and 31 from their scrambled or randomly oriented positions to their predetermined indexed or registered positions. If the stationary indicia characterized by the numbered zones 18, 19, 20 and 21 are properly oriented relative to their associated movable indicia in the form of arrows 39, 40 and 42, electrical circuit 36 will be closed between terminals 37 and 38.

When the person lays credit card device 10 in tray 63 with terminals 37 and 38 engaging electrical contact 64 and 65 indicator light 68 will become energized and thereby indicate to the merchant that a valid use is being made of credit card device 10.

From the foregoing it will be evident that the present invention has provided a fool proof credit card in which all of the various advantages are fully realized.

What is claimed is:

1. A self authenticating credit card device comprising:
   (a) a substantially flat opaque card having a front face marked with credit information, a rear face, and a rectangular edge extending between the front and rear faces;
   (b) plural circular sockets formed between the card front face and a card interior portion;
   (c) plural retaining pockets formed within the card between the front and rear faces;
   (d) plural discs rotatably positioned in the pockets with portions projecting beyond a straight common edge of the card so that a person may selectively manually rotate the discs, the pockets defining slits in the card edge that are shorter than the diameter of the discs to assist in holding the discs in the pockets;
   (e) hubs projecting outwardly from central portions of the discs into corresponding circular sockets;
   (f) first visible indicia marked on the hubs and second visible indicia marked in a plurality of annular locations on the card front face surrounding the hubs, the first and second indicia corresponding with one another and being relatively movable to establish a predetermined secret combination;
   (g) slots formed through the discs; and,
   (h) an electrical circuit characterized by a pair of terminals carried by the card and electrically conductive segments carried by the card and discs, the electrically conductive segments carried by the discs being wiper blades extending into corresponding slots;
   wherein when the discs are rotated to arrange the first and second indicia in the predetermined secret combination the electrical circuit is switched from an interrupted condition to a closed condition so that electrical current may travel continuously from one terminal, through the wiper blades and other electrically conductive segments and to the other terminal.

2. The structure according to claim 1, wherein: each wiper blade is a leaf spring cantilevered from a a peripheral portion of its associated slot.

3. The structure according to claim 2, wherein: each wiper blade is shaped in its central region with a hump, a flat portion of which extends beyond the external periphery of the associated disc.

4. The structure according to claim 3, wherein the electrical circuit includes: multiple pairs of mating leads positioned to make electrical wiping contact with corresponding wiper blades, the individual leads of each pair of mating leads being spaced by a distance shorter than the length of the flat portion of the associated wiper blade.

5. The structure according to claim 1, wherein: the electrical circuit terminals are elongated strips arranged on opposing margins of the rear face of the card.

6. The structure according to claim 1, including: a credit card information recording device having an electrical signal circuit with a pair of electrical contacts arranged and spaced to engage the terminals so that when the signal circuit contacts are engaged with the electrical circiut terminals and the predetermined secret combination is established then a signal will be imparted if the credit card is being validly used.

7. The structure according to claim 6, wherein: the discs are opaque and four in number.

References Cited

UNITED STATES PATENTS

| | | | |
|---|---|---|---|
| 2,517,619 | 8/1950 | Ainley | 194—4 |
| 2,536,155 | 1/1951 | Brand | 235—61.12 |
| 3,287,839 | 11/1966 | Rotwein | 40—2.2 |
| 3,399,473 | 9/1968 | Jaffe | 40—2.2 |
| 3,401,830 | 9/1968 | Mathews | 221—2 |

MAYNARD R. WILBUR, Primary Examiner

R. M. KILGORE, Assistant Examiner

U.S. Cl. X.R.

200—46; 235—61.7 B, 61.12 N; 340—149 A